(12) United States Patent
García González et al.

(10) Patent No.: US 11,805,736 B2
(45) Date of Patent: Nov. 7, 2023

(54) FODDER DISTRIBUTOR

(71) Applicant: LA PARRA DEL SOBERAL, S.L.U., Santibáñez el Alto (ES)

(72) Inventors: Juan García González, Santibáñez el Alto (ES); Jesús García González, Santibáñez el Alto (ES)

(73) Assignee: LA PARRA DEL SOBERAL, S.L.U., Santibanez el Alto (ES)

( * ) Notice: Subject to any disclaimer, the term of this patent is extended or adjusted under 35 U.S.C. 154(b) by 0 days.

(21) Appl. No.: 17/627,749

(22) PCT Filed: Jun. 25, 2020

(86) PCT No.: PCT/ES2020/070411
§ 371 (c)(1),
(2) Date: Jan. 17, 2022

(87) PCT Pub. No.: WO2021/009395
PCT Pub. Date: Jan. 21, 2021

(65) Prior Publication Data
US 2022/0256772 A1 Aug. 18, 2022

(30) Foreign Application Priority Data
Jul. 17, 2019 (ES) ................. ES201930659

(51) Int. Cl.
*A01D 87/12* (2006.01)
*A01D 87/00* (2006.01)
*A01D 90/08* (2006.01)

(52) U.S. Cl.
CPC ......... *A01D 87/12* (2013.01); *A01D 87/0007* (2013.01); *A01D 90/083* (2013.01)

(58) Field of Classification Search
CPC ........ A01F 29/005; A01F 29/06; A01F 29/10; A01D 90/083; A01D 2087/128;
(Continued)

(56) References Cited

U.S. PATENT DOCUMENTS 3,035,729 A 5/1962 Soares et al.
3,942,666 A * 3/1976 Pfremmer ................. B60P 1/38
414/501

(Continued)

FOREIGN PATENT DOCUMENTS

CA 2236953 A1 * 11/1998 ........... A01F 29/005
EP 1806048 A1 * 7/2007 ........... A01F 29/005
(Continued)

OTHER PUBLICATIONS

ISR for International Application PCT/ES2020/070411 mailed Oct. 7, 2020.
(Continued)

*Primary Examiner* — Gregory W Adams
(74) *Attorney, Agent, or Firm* — LADAS & PARRY LLP

(57) ABSTRACT

The invention relates to a fodder distributor formed by: a propelled carriage comprising a first shredding surface in the rear part, in the direction of travel, with first propulsion means, and a second surface in the front part, for feeding bales to the first surface; a first mechanism for shredding parallelepiped bales, with a shaft having a first end connected to rotation means and longitudinal blades projecting radially from the shaft; second propulsion means on the second surface; and respective panels for providing additional bale support, which are positioned horizontally adjacent to the second surface and have means for moving the bales to said surface.

14 Claims, 7 Drawing Sheets

(58) Field of Classification Search
CPC .... A01D 87/127; A01D 90/10; A01D 90/105; A01D 87/12; A01D 87/0007; B65G 2814/032
See application file for complete search history.

(56) References Cited

U.S. PATENT DOCUMENTS

| | | | | |
|---|---|---|---|---|
| 4,101,081 A | * | 7/1978 | Ritter | A01D 90/10 241/282 |
| 4,215,964 A | * | 8/1980 | Schrag | A01D 85/005 56/476 |
| 4,232,986 A | * | 11/1980 | Johnson | A01D 90/083 414/24.5 |
| 4,537,548 A | * | 8/1985 | Lockhart | A01D 90/083 414/24.5 |
| 4,844,675 A | * | 7/1989 | Strosser | A01D 90/08 56/473.5 |
| 10,070,589 B1 | * | 9/2018 | Kuhns | A01D 90/10 |
| 11,117,741 B2 | * | 9/2021 | Curley | B60P 1/649 |
| 2008/0213066 A1 | * | 9/2008 | Bootsma | A01D 90/10 414/25 |
| 2015/0327441 A1 | | 11/2015 | Currie | |

FOREIGN PATENT DOCUMENTS

| | | | | |
|---|---|---|---|---|
| ES | 2334604 A1 | * | 3/2010 | ........... A01D 90/105 |
| ES | 2686536 T | | 10/2018 | |
| FR | 3050357 A1 | * | 10/2017 | ........... A01D 90/105 |
| NL | 1021945 C2 | * | 5/2004 | ........... A01F 29/005 |
| WO | 2005079556 A1 | | 9/2005 | |

OTHER PUBLICATIONS

Written Opinion for International Application PCT/ES2020/070411 dated Oct. 7, 2020.

* cited by examiner

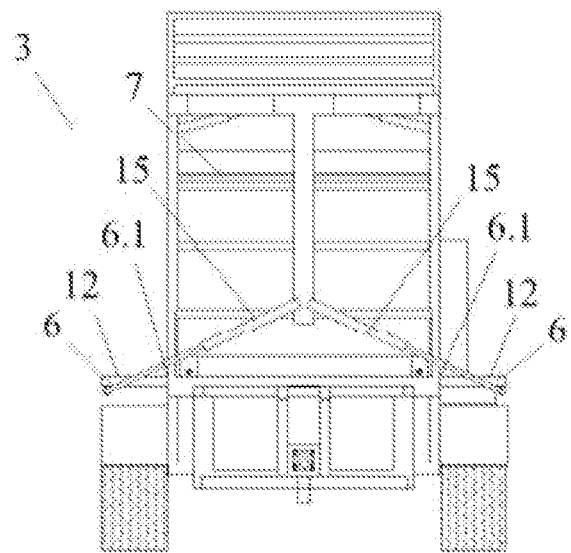
Fig. 2.1
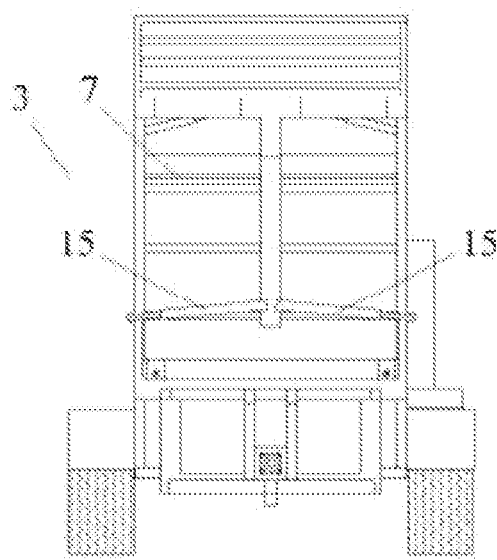
Fig. 2.2

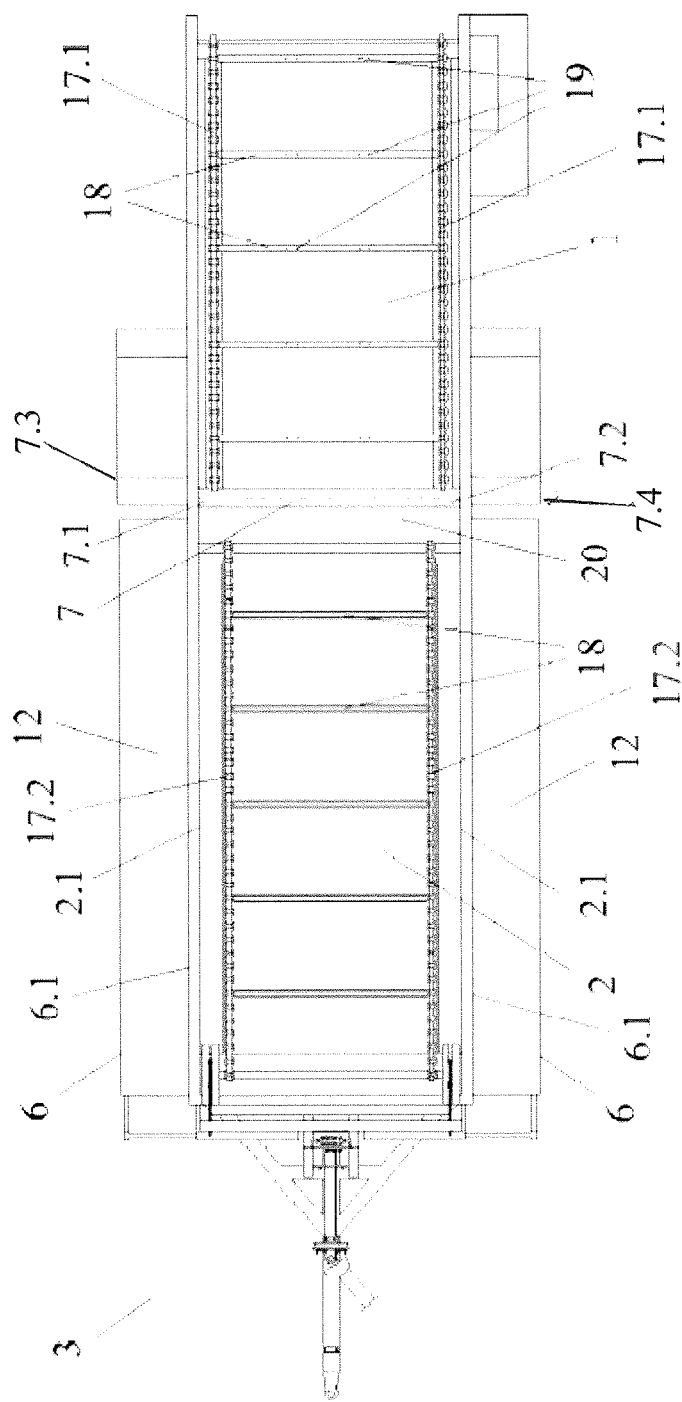
Fig. 4.1

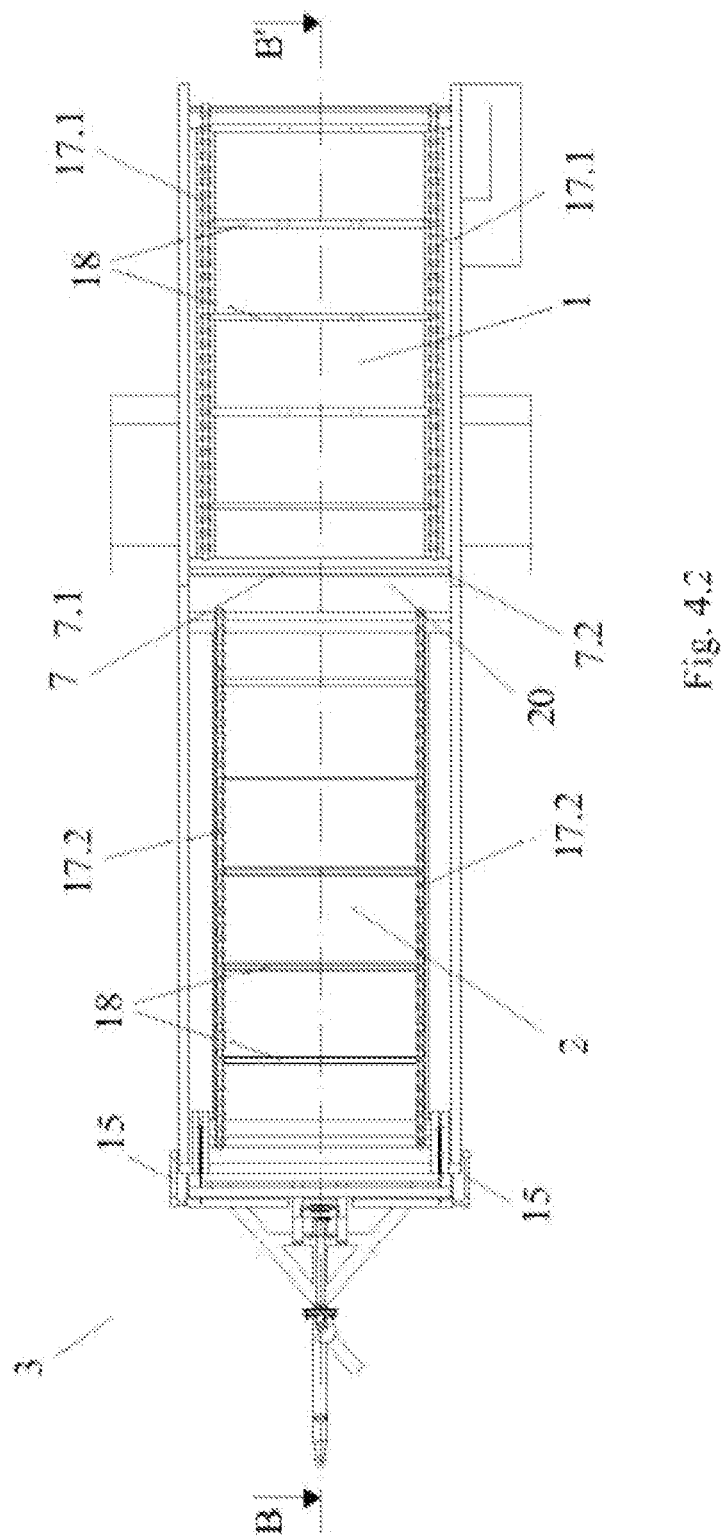
Fig. 4.2

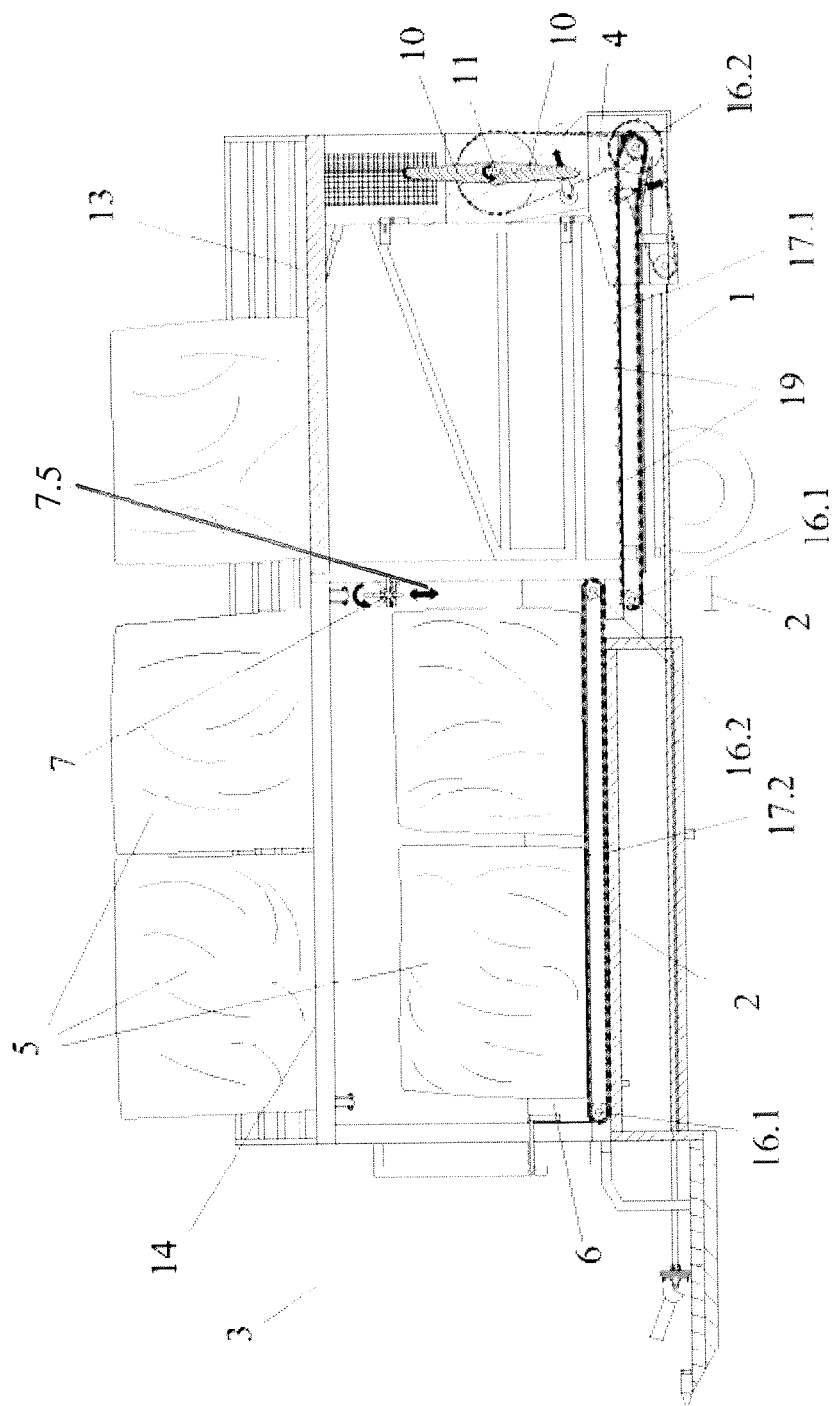

FODDER DISTRIBUTOR

CROSS REFERENCE TO RELATED APPLICATION

This application is a national phase entry under 35 USC 371 of International Patent Application No.: PCT/ES2020/070411 filed on 25 Jun. 2020, which claims the benefit of ES Application No. 201930659 filed on 17 Jul. 2019, the entire contents of which are incorporated herein by reference.

TECHNICAL FIELD OF THE INVENTION

The present invention relates to the technical field of fodder distributors in pastures for animal grazing, with this fodder being in the form of males and, specifically to a bale distributor valid both liar parallelepiped and cylindrical bales.

BACKGROUND OF THE INVENTION

At present a series of machines or devices are used that perform the fodder distribution work in the pastures, so that the livestock can feed with them. These machines require moving means, to be able to cover the surface of the pastures whilst the fodder is being distributed.

Fodder distribution rust be performed uniformly, so that it is well distributed throughout the pasture surface avoiding the creation of areas of accumulation that cause a heater concentration of animals thereon.

Given that the fodder is in the form of bales for a better storage thereof before its distribution a shredding or separation of the product is necessary whereby the bale that it forms part of is broken up.

Many of the machines that currently exist perform the work of cutting up the bale, by means of toothed wheels, worms, rollers. . . . This manner of shredding the fodder is not acceptable for a distribution such as that considered herein, since as the fodder is divided into bits it would be more dispersed, with the subsequent product waste.

Furthermore, since the pasture surface area over which the fodder is to be distributed is not usually small, it is necessary that these machines have sufficient bale support space to be able to cover the distribution of all or the majority of the surface area of the pastures. Otherwise, it would be necessary to make continuous journeys to reload with bales to the storage area with the consequent time wasting and increased fuel expense that lead to lower productivity.

Furthermore, the manner of making bales was in parallelepiped shape and the machines were adapted to act on this type of bale. Later on, when the manner of making cylindrical bales arose, of greater dimensions than the parallelepiped ones, machines appeared aimed at this type of bale, with ways of shredding and distribution adapted to this new shape of the bales.

The current situation is that there has been an increasing production of machines suitable for cylindrical bales, when in tact there continues to be a greater production of parallelepiped bales on the market. Nevertheless, and in any case, since both types of bale coexist, the reality is that a machine which is only capable of efficiently acting on one form of presentation of the bales is in and may entail execution problems when faced with a consignment of bales of the shape that is different to that whereon the machine is equipped to act.

As an example of the state of the art, we can mention reference document US3035729, as well as documents ES1056934 and ES2686536, that this applicant is holder of.

Reference document U.S. Pat. No. 3,035,729 is aimed at parallelepiped bales. It is a machine on a taller that has a shaft with paddles that shred the fodder and separate it from the bale to then discharge it out of the machine. The problem with this mi-chine is that it is formed by multiple shafts perpendicular to one another that complicate the operation due to the need for linkages that may give rise to fault.

Likewise, this form of shredding is not suitable for cylindrical bales, so that this machine is aimed at the shredding and distribution of parallelepiped bales, but it will not be capable of acting on cylindrical bales if necessary, which would cause a management problem in the farm.

Reference document ES1056934 relates to a device adaptable to moving means and is aimed at cylindrical bales, so that it comprises an unwinding area of a bale with propulsion means that move it to the rear part, wherein it has a series of fins which in their rotation movement push the bale making it rotate towards the front area. This rotation movement of the bale backwards combined with its movement forwards by the propulsion means generate the unwinding of the bale which exits the device through the rear part, distributing it over the pasture area as the moving means travel over it. It also comprises a storage area for the bales in front of the unwinding area.

This distribution device has advantages with respect to the previous ones, as it allows the handling thereof by a single operator, and the loading of more than one bale on the machine, so that less time is lost in trips of the device to the bale storage area to load a new bale.

Nevertheless, it continues to have certain drawbacks as a storage area of one or two additional hales is completely insufficient for the usual areas of pastures, whose surface cannot be covered with two or three bales per trip. This creates the need to continue going hack to the Inn storage area, to load up with more hales and restart the distribution, with the time wasting and costs this entails.

Furthermore, it is a machine aired at cylindrical bales that it is not efficiently compatible with hales of a different shape Reference document ES2686536 attempted to resolve some of these drawbacks by means of an improved fodder distributor formed by a propelled carriage adapted to moving means that being, as in the previous case, a device aimed at cylindrical bales, has the improvement of comprising at least one tilting platform for storage and unloading positioned on the first shredding surface or on the surface that in the previous document already served as a storage area.

This manages to considerably increase the number of bales that this device is capable of containing when it leaves the warehouse, so that the surface that it can cover without returning to load up with more bales is much greater and in the case that it continues to be necessary to load more bales the number of trips to the warehouse for new loads is significantly reduced.

Nevertheless, it continues to be a device suitable for a single type of bale, in this case cylindrical, so that faced with the existence of parallelepiped bales, this type of device cannot act effectively, entailing a problem for the Inn which would find it difficult to have one machine for each type of bale.

Hence, in the state of the art the existence is not known of any fodder distributor that is versatile and allows effective action thereof on bales of any shape, in addition to being easy to operate, to be able to resolve the management problem existing in pasture farms, which in practice may have to act with hales of any shape and not just one in particular.

DESCRIPTION OF THE INVENTION

The fodder distributor, presented in the form of bales as proposed herein, is finned by a carriage propelled by moving means that comprises in the rear part thereof according to the direction of movement, a first shredding surface with first propulsion means of the fodder towards the end part of the carriage wherein it has an outlet opening and in the front part of the carriage a second surface for feeding bales to the first surface.

This device comprises a first shredding mechanism of parallelepiped bales disposed on the second surface, comprising a horizontal shaft transversal to the carriage with a first end connected to rotation means and a second opposite end, and longitudinal blades that project from said shaft.

Said horizontal shalt is situated in a first intermediate position to the first and second surfaces at a certain height over said second surface.

Likewise, this device comprises second propulsion means of at least one bale disposed on the second surface being horizontal and located at a certain height over the first surface.

In the case of the parallelepiped bales disposed on the second surface, these second propulsion means move them towards the first surface in the rear part of the can age, so that in said movement they reach the first shredding mechanism that acts on said bales and breaks them up, successively separating line layers of bale that are deposited on the first surface, leaving the fodder loose and ready for its distribution, which is perfumed through the outlet opening thanks to the movement thereof by means of the first propulsion means.

The device comprises, in turn, respective panels for providing additional bale support, each one disposed at one side of the second surface.

Each one of the panels has a horizontal position adjacent to said second surface, such that it configures an additional bale support surface. Furthermore, each panel has means for moving said bales disposed on one of the additional surfaces to the second surface, it being possible to independently actuate these moving means of both panels.

In this way, both panels provide respective additional surfaces tar supporting bales, so that it increases the device's storage surface.

With the fodder distributor proposed herein, a significant improvement to the state of the art is obtained.

This is the case as a versatile device is achieved, which, on the one hand, is capable of shredding and distributing parallelepiped bales, thanks to a first shredding mechanism, and, furthermore, can have a second shredding mechanism suitable to act on cylindrical bales.

Thus, on the one hand this device is adapted to the distribution of parallelepiped bales, already being an improvement from the standpoint of simplicity of the shredding mechanism used, which allots attaching the parallelepiped bales effectively, being a simple mechanism with few elements involved and all of them disposed so that they do not generate crosses or complicated connections.

But additionally, on the other hand and as most relevant improvement, the first shredding mechanism of parallelepiped bales may be forming part of a device which already had a second shredding mechanism adapted to cylindrical bales, so that it enables a complete effectiveness of the device with the shredding of either of the two types of bale on the market, both parallelepiped and cylindrical, as in each case it uses the suitable mechanism for the shape and dimensions of the corresponding type of bale so that its effective operation is always obtained.

Both the first and second shredding mechanisms and the first and second propulsion means are simple, based on the operation of shafts which in all cases are parallel, so that it significantly facilitates the manufacturing of the device, of the transmission means, and a simpler device is obtained and less likely to generate operating problems.

On the other hand, it is a device that allows, if possible, the supporting of a larger number of bales than on other devices, which already had platforms above the first and second surface whereon to store additional bales for their consecutive use as the bales are distributed.

In this case thanks to two panels for providing additional bale support, it achieves the expansion of the second surface in two additional bale storage surfaces, adjacent to said second surface, at the same these panels being in charge of pushing the bales deposited on the additional surfaces to the second surface Whereon the second propulsion means are located.

It is, therefore, a versatile device, suitable for any bale shape, and effective in the action on any of said shapes, simple to handle by a single operator and which allows a large bale load capacity, saving in this way in costs and time, as it significantly reduces the number of reloads thereof to complete the distribution over the whole pasture suttee.

BRIEF DESCRIPTION OF THE DRAWINGS

For the purpose of aiding the better understanding of the characteristics of the invention, in accordance with a preferred example of a practical embodiment of the same, a set of drawings is attached as an illegal part of said description wherein, by way of illustration and not limitation, the following is portrayed:

FIGS. 2.1 and 2.2.—Portrays front elevation views for a horizontal and vertical position of the side panels respectively, of the fodder distributor, fore a preferred embodiment of the invention.

FIGS. 4.1 and 4.2.—Portray sectional views according to a longitudinal plane A-A', of the fodder distributor, for a horizontal and vertical position of the panels respectively, for a preferred embodiment of the invention FIG. 5.—Portrays a sectional view according to a longitudinal plane B-B' of the kidder distributor, for a preferred embodiment of the invention.

DETAILED DESCRIPTION OF A PREFERRED EMBODIMENT OF THE INVENTION

Figure 1:
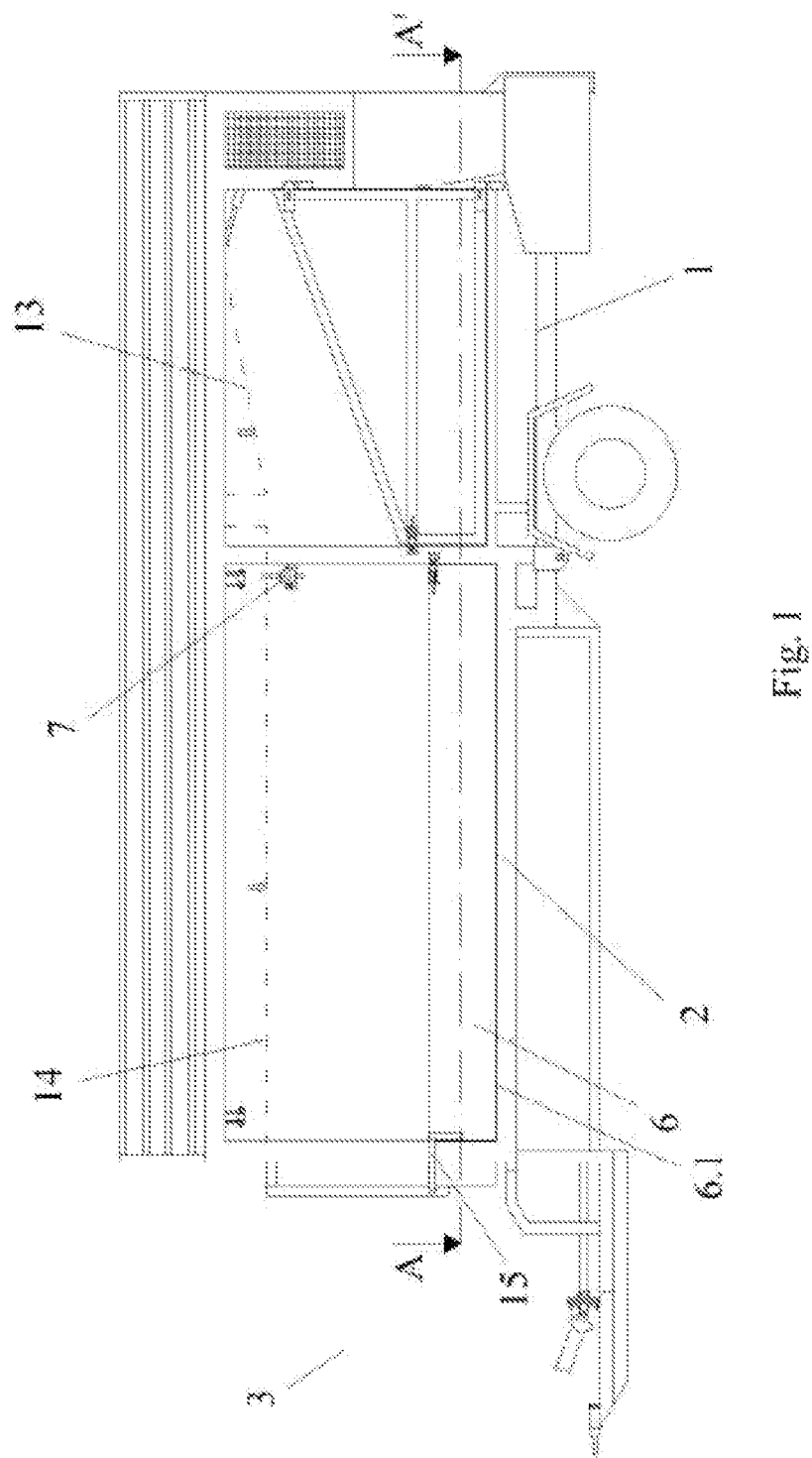
FIG. 1.—Portrays a profile view of the fodder distributor, for a preferred embodiment of the invention.

In light of the figures provided, it can be observed how in a preferred embodiment of the invention, the fodder distributor proposed herein, for fodder presented in the form of bales, is formed by a carriage (3) propelled by moving means, which comprises in the rear part thereof according to the direction of travel, a first shredding surface (1) with first propulsion means of the fodder towards the end part of the carriage (3) wherein it has an outlet opening (4) and in the front part of the carriage (3) a second surface (2) for feeding bales (5) to the first surface (1).

This device comprises a first shredding mechanism for parallelepiped bales (5) disposed on the second surface (2), second propulsion means of the at least one bale (5) disposed on said second surface (2) and, respective panels (6), for additionally supporting bales each one disposed at one side (2.1) of the second surface (2) where each panel has means for moving said bales (5) to the second surface (2), which can be independently actuated.

Hence, the first shredding mechanism, as portrayed in FIGS. 2.1, 2.2, 3, 4.1, 4.2 and 6 comprises a horizontal shaft (7) transversal to the carriage (1) situated in an intermediate position to the first and second surfaces (1, 2) and at a certain height over the second surface (2), where the shaft (7) has a first end (7.1) connected to a rotator (7.3), and a second opposite end (7.2). Likewise, this horizontal shaft (7) has longitudinal blades (8) projecting radially from said shaft (7). In this preferred embodiment, there are a total of four longitudinal blades (8) that project from the shaft (7) and one of them comprises a plurality of teeth (9) on the distal side thereof.

As can be observed in FIG. 5, in this device the second surface (2) is positioned horizontally and at a certain height over the first surface (1). In this way, the bales (5) disposed on the second surface (2), mow by means of the second propulsion means towards the first surface (1) and on reaching the end of the second surface (2), the first shredding mechanism acts on the parallelepiped bale (5) breaking it up, for the fodder separated film the bale to later descend to the first surface (1) which is at a lower height than the second surface (2).

In the preferred embodiment of the invention, the horizontal shaft (7) of the first shredding mechanism is positioned at a height over the second surface (2) that is the same or appreciably less than the height of a parallelepiped bale (5) to be able to effectively act on said bale and also the device comprises height adjuster (7.5) of said horizontal shaft (7) over the second surface (2).

In this way, since not all the parallelepiped bales (5) have the same height, thanks to these adjustment means (not represented in the Figures) it is possible to place the shaft (7) at the effective height of action on the specific bale (5) that will be acted on so that they always work in the most effective manner, whatever the bale (5) height.

The shaft (7) thus disposed at a certain height, as it rotates, performs successive cuts on the parallelepiped bale (5), which descends to the first surface (1) in the form of layers that will end up disintegrating in loose fodder with the dropping itself or due to the movement by the first propulsion mechanism.

Figure 3:
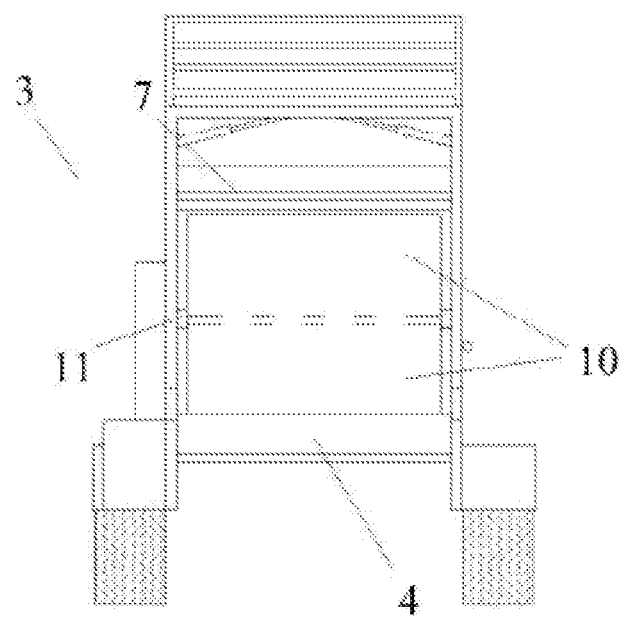
FIG. 3.—Portrays a back elevation view of the fodder distributor, for a preferred embodiment of the invention.
Figure 6:
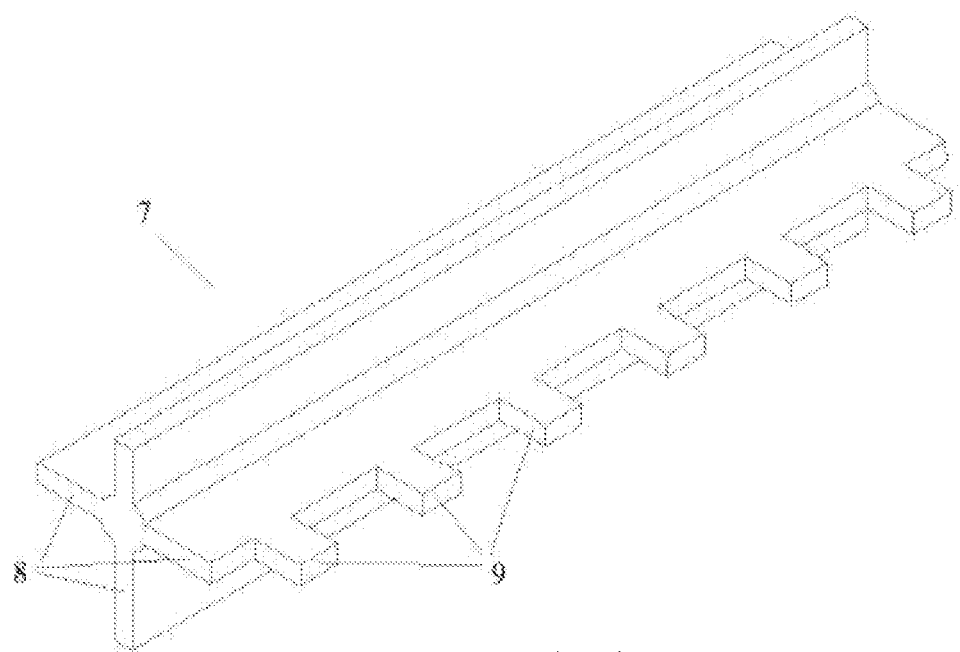
FIG. 6.—Portrays a perspective view of the horizontal shaft of the first shredding mechanism of the fodder distributor, for a preferred embodiment of the invention.

In this preferred embodiment of the invention, as portrayed in FIGS. 3 and 5, the device comprises a second cylindrical bale shredding mechanism disposed in the end part of the carriage (3), formed by two bale (5) unwinding, fins (10) which have a horizontal rotation shaft (11) connected to the first propulsion means, such that the rotation of both is simultaneous.

Hence, with this second shredding mechanism, the device is suitable for the distribution of both parallelepiped and cylindrical bales (5). In the case of cylindrical bales, they arrive with their cylindrical shape to the first surface (1) in the rear area of the carriage (3) and the first propulsion means generate thereon a movement to the rear part of the carriage (3). In said final part is where the outlet opening (4) for the unwound bale is located and its height is precisely defined by the fins (10) of the second shredding mechanism.

In this way, the fins (10) push the cylindrical bale (5) positioned on the first suttee (1) forwards, simultaneously to the action of the first propulsion means that continue displacing the bale (5) in the opposite direction, towards the rear part, so that it generates the rotation and unwinding of said bale that exits through the outlet opening (4).

Given that the device comprises first and second shredding means in the preferred embodiment of the invention, the first shredding mechanism has at least the second end (7.2) of the horizontal shaft (7) thereof fastened to the carriage (3) by a detachable fastener (7.4).

Furthermore, it this embodiment the first end (7.1) of the horizontal shaft (7) of the first shredding mechanism is fastened to the carriage (3) by a tilt shaft, such that said horizontal shaft (I is collapsible with respect to said first end (7.1) to allow the passage of cylindrical bales.

Thus, since the cylindrical bales (5) are of greater dimensions than the parallelepiped bales, when it is necessary to load on the carriage (3) bales of said cylindrical shape, the first shredding mechanism is removed by a tilting thereof around the first end (7.1) of the Shaft (7), being disposed at one side of the carriage (3) without generating an obstacle for working with cylindrical bales.

Likewise, at the time that the bales (5) that are going to be distributed over the pasture are of parallelepiped shape, the horizontal shall (7) of the first shredding mechanism is again placed in its position so that said first mechanism is operational for the shredding of bales. In this case, the second shredding mechanism, aimed at cylindrical bales, does not entail any problem or hindering in the shredding of parallelepiped bales, since they reach the first surface (1) almost broken up in the form of fine bits of fodder, that with the movement itself by means of the first propulsion mechanism exits through the outlet opening (4) of the carriage and is distributed uniformly.

As regards the two panels (6) for providing additional bale support of this distributor, they have a horizontal position adjacent to the second surface (2), that configures an additional bale support surface (12). In this way, when the carriage (3) starts its fodder distribution work, it exits the bale loading warehouse with at least one bale on the second surface (2) and at least one bale on both additional surfaces (12) configured by these panels (6) in their horizontal position.

As shown in FIGS. 2.1 and 4.1, in this preferred embodiment of the invention, said panels (6) for providing additional bale support have a first end (6.1) for fastening to one side (2.1) of the second surface (2) of the carriage respectively, such that in their horizontal position they are contained in the plane of said second surface (2).

Said panels (6) are tilting and the means for moving the bales (5) disposed on one of the additional surfaces (12) to the second surface CO are formed by a rotation shall at the first end (6.1) of each panel and tilting actuation means of each panel (6) from the horizontal position thereof to a vertical position that generates the movement of the bales (5) from one of the additional surfaces (12) to the second surface (2).

In this preferred embodiment of the invention, specifically two parallelepiped bales (5) fit on the second surface (2), and two more on each one of the additional surfaces (12). Hence, when the bales (5) disposed on the second surface (2) have been shredded and they fall onto the first surfaces (1) wherefrom it is going to be distributed to the pastures, one of the panels (6), which in this embodiment are tilting, tilt from the position shown in FIGS. 2.1 and 4.1, to a vertical position that can be observed in FIGS. 2.2 and 4.2, so that it generates the movement of the two bales supported on the corresponding additional surface (12) to the second surface (2).

When these two new bales (5) on the second surface (2) have been shredded and pass to the first surface (1) for their distribution, leaving said second surface (2) free, the same tilting process is performed of the second panel (6) from its horizontal position to its vertical position, pushing the two bales (5) supported by this other additional surface (12) to the second surface (2) and the process is repeated.

In other embodiments, the panels (6) for providing additional bale support instead of tilting have other means for moving the bales (5) to the second surface (2) and said moving means may be thrilled by sliders, for example, that slide said panels (6) towards the second surface (2), generating the movement thereto of the bales (5) supported on the panels, or even be formed by sliders that only slide the bales from the panels (6) to the second surface (2), keeping said panels (6) fixed in their horizontal position adjacent to the second surface (2).

In this preferred embodiment of the invention, the fodder distributor farther comprises additional bale storage and unloading means formed by a first and second tilting platforms (13, 14) located on the first and second surface (1, 2) respectively, positioned at a height over them higher than the height of the bales disposed on said first and second surfaces (1, 2), where both first and second tilting platforms (13, 14) have tilting means on the second surface (2). Thus, when the carriage (3) starts its route through the pastures, it has a high bale storage capacity which allows significantly reducing the carriages tips to the warehouse to load up on bales. This tilting of said first and second tilting platform (13, 14) is represented by firms of dotted lines in FIG. 1, meaning the tilting thereof.

As portrayed in FIGS. 2.1 and 2.2, in this preferred embodiment of the invention, the tilting means of each panel (6) comprises a rotation shaft at the first end (6.1) for fastening to one side (2.1) of the second surface (2) and tilting actuation means of said panel (6). In this case, said tilting actuation means of each panel are formed by a hydraulic cylinder (15), but in other embodiments it may be a pneumatic cylinder or similar means.

On the other hand, as can be observed in FIG. 5 the first and second propulsion means in this preferred embodiment of the invention, comprise a first and second worm displacement elements (17.1, 17.2) each one of them connected to a list and second parallel rotation shafts (16.1, 16.2) disposed at the front and rear end according to the direction of travel of the list and the second strike (1, 2) respectively, and transmission means (21) between the second rotation shaft. (16.2) of the second worm displacement element (17.2) and the first rotation shaft (16.1) of the first worm displacement element (17.1).

Likewise, in this case, both the first and the second worm displacement element (17.1, 17.2) are formed by two side chains connected to the corresponding first and second rotation shafts (16.1, 16.2) by respective toothed wheels and, bars (18) perpendicular to said chains, joined thereto such that said bar has a certain separation space with the two bars (18) consecutive thereto.

Furthermore, so that the movement of the fodder on the first surface is more efficient, in this embodiment the bars (18) of the worm displacement element (17.1) of the first propulsion means have a plurality of sharp elements (19) projecting perpendicularly therefrom. These sharp elements (19) in the case of cylindrical bales collaborate in the engagement of the lower part of the bale (5) to achieve its movement to the end part of the first surface (1), shredding it, whilst in the case of parallelepiped bales (5), they reach the first surface (1) already cut into laminar pieces, these sharp elements (19) also collaborate in the movement thereof to the end, breaking them up, on being stuck into them.

As shown in FIG. 5, in this preferred embodiment of the invention, the first and second propulsion means comprise a length (20) of overlapping between both to avoid the loss of fodder therebetween. In other embodiments, they may be consecutively disposed, without overlapping, but without space between both propulsion means, always with a view to avoiding the existence of a space to lose fodder between both means.

The embodiment described is solely an example of the present invention, therefore, the specific details, terms and phrases used in this specification should not be understood as limiting, but they have to be only understood as a base for the claims and as a representative base that provides an understandable description, as well as the sufficient information far a person skilled in the art to apply the present invention.

The invention claimed is:

1. Fodder distributor, presented in the form of bales, formed by a carriage propelled by moving means that comprises in the rear part thereof according to the direction of travel, a first shredding surface with first propulsion means of the fodder towards the end part of the carriage wherein it has an outlet opening and in the front part of the carriage a second surface for feeding bales to the first surface, wherein said fodder distributor comprises:
   a first shredding mechanism of parallelepiped bales disposed on the second surface, which comprises a horizontal shaft transversal to the carriage situated in an intermediate position to the first and second surfaces and at a certain height over the second surface, where the shaft has a first end connected to a rotator, a second opposite end and longitudinal blades projecting radially from the shaft;
   second propulsion means of at least one bale disposed on the second surface, this being horizontal and located at a certain height over the first surface, and;
   respective panels for providing additional bale support, each one disposed at one side of the second surface, where each panel has a horizontal position adjacent to it, such that it configures an additional bale support surface and where each panel has means for moving said bales disposed on one of the additional surfaces to the second surface, it being possible to independently actuate these moving means of both panels.

2. Fodder distributor, according to claim 1, which comprises a second cylindrical bale shredding mechanism disposed in the rear part of the carriage, formed by two bale unwinding fins which have a horizontal rotation shaft connected to the first propulsion means, such that the rotation of both is simultaneous.

3. Fodder distributor, according to claim 2, wherein at least the second end of the horizontal shaft of the first bale shredding mechanism is detachable from the carriage.

4. Fodder distributor, according to claim 3, wherein the first end of the horizontal shaft of the first bale shredding mechanism is fastened to the carriage by a tilt shaft, such that the horizontal shaft is collapsible with respect to said first end to allow the passage of cylindrical bales.

5. Fodder distributor, according to claim 1, wherein the horizontal shaft of the first shredding mechanism, is positioned at a height over the second surface the same or appreciably lower than the height of a parallelepiped bale.

6. Fodder distributor, according to claim 5, wherein the height of the horizontal shaft (7) of the first shredding mechanism, on the second surface is adjustable.

7. Fodder distributor, according to claim 1, wherein the horizontal shaft of the first shredding mechanism comprises a plurality of teeth on the distal side of at least one of the blades thereof.

8. Fodder distributor, according to claim 1, wherein the panels for providing additional bale support have a first end for fastening to a side of the second surface of the carriage respectively such that in their horizontal position they are contained in the plane of said second surface, where said panels are tilting and the means for moving the bales disposed on one of the additional surfaces to the second surface are formed by a rotation shaft at the first end of each panel and tilting actuation means of each panel from the horizontal position thereof to a vertical position that generates the movement of the bales from one of the additional surfaces to the second surface.

9. Fodder distributor, according to claim 8, wherein the tilting actuation means of a panel (6) are formed by a hydraulic or pneumatic cylinder.

10. Fodder distributor, according to claim 1, wherein the first and second propulsion means comprise a first and second worm displacement elements each one of them connected to interconnected first and second parallel rotation shafts disposed at the front and rear end according to the direction of travel of the first and the second surface respectively.

11. Fodder distributor, according to claim 10, wherein the first and/or second worm displacement element is formed by two side chains connected to the corresponding first and second rotation shafts by respective toothed wheels and, bars perpendicular to said chains, joined thereto such that said bar has a certain separation space with the two bars consecutive thereto.

12. Fodder distributor, according to claim 10, wherein the bars of the worm displacement element of the first propulsion means have a plurality of sharp elements projecting perpendicularly therefrom.

13. Fodder distributor, according to claim 10, wherein the first and second propulsion means comprise a horizontal length of overlapping thereof.

14. Fodder distributor, according to claim 1, which comprises additional bale storage and unloading means formed by at least one first tilting platform located on the first and/or second surface, positioned at a height over them higher than the height of the bales disposed on said first and second surfaces, where said at least one tilting platform has tilting means on the second.

* * * * *